US007412688B2

(12) United States Patent
Liang et al.

(10) Patent No.: US 7,412,688 B2
(45) Date of Patent: *Aug. 12, 2008

(54) WORKFLOW DEFINING SYSTEM AND WORKFLOW MANAGING SYSTEM

(75) Inventors: Chia-Yi Liang, Shindian (TW); Andy Chen, Shindian (TW)

(73) Assignee: VIA Technologies Inc., Shindian, Taipei (TW)

( * ) Notice: Subject to any disclaimer, the term of this patent is extended or adjusted under 35 U.S.C. 154(b) by 598 days.

This patent is subject to a terminal disclaimer.

(21) Appl. No.: 10/768,068

(22) Filed: Feb. 2, 2004

(65) Prior Publication Data
US 2005/0172257 A1    Aug. 4, 2005

(30) Foreign Application Priority Data
Nov. 14, 2003    (TW) .............................. 92132081 A

(51) Int. Cl.
G06F 9/44    (2006.01)
(52) U.S. Cl. ...................... 717/106; 717/104; 717/124
(58) Field of Classification Search ........................ None
See application file for complete search history.

(56) References Cited

U.S. PATENT DOCUMENTS

| | | | | | |
|---|---|---|---|---|---|
| 4,320,451 | A | * | 3/1982 | Bachman et al. | 718/106 |
| 4,369,494 | A | * | 1/1983 | Bienvenu et al. | 713/400 |
| 4,394,725 | A | * | 7/1983 | Bienvenu et al. | 718/106 |
| 5,430,850 | A | * | 7/1995 | Papadopoulos et al. | 719/314 |
| 5,495,409 | A | | 2/1996 | Kanno | |
| 5,734,837 | A | * | 3/1998 | Flores et al. | 705/7 |
| 5,774,661 | A | | 6/1998 | Chatterjee et al. | |
| 5,799,297 | A | | 8/1998 | Goodridge et al. | |
| 5,999,911 | A | * | 12/1999 | Berg et al. | 705/9 |
| 6,041,306 | A | * | 3/2000 | Du et al. | 705/8 |
| 6,073,109 | A | * | 6/2000 | Flores et al. | 705/8 |
| 6,243,736 | B1 | * | 6/2001 | Diepstraten et al. | 718/108 |
| 6,279,009 | B1 | * | 8/2001 | Smirnov et al. | 707/103 R |
| 6,424,948 | B1 | | 7/2002 | Dong et al. | |

(Continued)

OTHER PUBLICATIONS

NNRD40792 Audit Trail Support forProgram Activity Implementations of Workflow Management Systems, Mar. 1, 1998, IBM, retrieved Mar. 10, 2007 from EAST search.*

(Continued)

Primary Examiner—Mary Steelman
(74) Attorney, Agent, or Firm—Bacon & Thomas, PLLC

(57) ABSTRACT

A workflow defining system comprises a state setting module, an instruction generating module, and a path generating module. The state setting module sets at least a first terminal state, a second terminal state, and a third terminal state. The instruction generating module generates a first instruction, a second instruction, and a third instruction respectively corresponding to the first, second, and third terminal states. The path generating module generates a first path, a second path, and a third path respectively according to the first, second, and third instructions. The first path according to the first instruction points to one of the first, second, and third terminal states. The second path according to the second instruction points to one of the first, second, and third terminal states. The third path according to the third instruction points to one of the first, second, and third terminal states. Furthermore, a workflow managing system is disclosed, and performs workflow management according to a workflow defined by the workflow defining system.

14 Claims, 9 Drawing Sheets

U.S. PATENT DOCUMENTS

| | | | |
|---|---|---|---|
| 6,574,675 B1 * | 6/2003 | Swenson | 719/316 |
| 6,720,967 B1 * | 4/2004 | Cox et al. | 345/440 |
| 6,829,764 B1 | 12/2004 | Cohen et al. | |
| 6,938,240 B2 * | 8/2005 | Charisius et al. | 717/104 |
| 7,051,071 B2 * | 5/2006 | Stewart et al. | 709/204 |
| 7,152,229 B2 | 12/2006 | Chong et al. | |
| 2002/0032590 A1 | 3/2002 | Anand et al. | |
| 2003/0050813 A1 | 3/2003 | Cohen et al. | |
| 2003/0050820 A1 | 3/2003 | Cohen et al. | |
| 2003/0050881 A1 | 3/2003 | Cohen et al. | |
| 2003/0208743 A1 * | 11/2003 | Chong et al. | 717/106 |
| 2004/0143811 A1 * | 7/2004 | Kaelicke et al. | 717/101 |
| 2004/0216082 A1 * | 10/2004 | Sun | 717/100 |
| 2005/0114854 A1 * | 5/2005 | Padisetty et al. | 718/1 |

OTHER PUBLICATIONS

Davulcu, Hasan et al; "Logic Based Modeling and Analysis of Workflows", p. 25-33, ACM 1998, retrieved Mar. 19, 2007.*

Joeris, Gregor; "Defining Flexible Workflow Execution Behaviors", 1999, retrieved from scholar.google.com search Mar. 19, 2007.*

Kaye, A. Roger, Karam, Gerald M; "Cooperating Knowledge-Based Assistants for the Office", ACM 1987, p. 297-326, retrieved Sep. 13, 2007 from google.com.*

Maia, Antonio Carlos Perira; Fuks, Hugo; de Lucena, Carlos Jose Pereira; "A model of the communicative behavior of designers involved in cooperative software design", p. 1-30, 1995, retrieved from google.com, Sep. 13, 2007.*

Grieskamp, Wolfgang; Gurevich, Yuri; Schulte, Wolfram; Veanes, Margus; "Generating Finite State Machines from Abstract State Machines", pp. 112-122, 2002 ACM, retrieved Oct. 18, 2007.

Mohan, Rakesh; Cohen, Mitchell A.; Schiefer, Josef; "A State machine Based Approach for a Process Driven Development of Web-Applications", pp. 52-66, Springer-Verlag Berlin Heidelberg 2002, retrieved from scholar.google.com search Sep. 18, 2007.

Mohan, Rakesh; Cohen, Mitchell A; Schiefer, Josef; "FlexFlow: Workflow for Interactive Internet Applications", IBM T.J. Watson Research Center, 2002, CiteSeer, retrieved Sep. 18, 2007.

Whittle, Jon; Schumann, Johann; "Generating Statechart Designs from Scenarios", pp. 314-323, ACM 2000, retrieved Sep. 18, 2007.

* cited by examiner

WORKFLOW DEFINING SYSTEM AND WORKFLOW MANAGING SYSTEM

BACKGROUND OF THE INVENTION

1. Field of Invention

The invention relates to a workflow defining and managing system and, in particular, to a workflow defining and managing system that is capable of establishing flowcharts to control the progress of work or data.

2. Related Art

To improve the work efficiency and to integrate the operation procedures of different departments, one usually designs a workflow to link up all operation procedures in view of actual needs. Then, a flowchart is established for different departments, so that they can execute and control their operation procedures according to this flowchart.

A conventional flowchart for debug operation procedure will be described below with reference to FIG. 1A. As shown in FIG. 1A, a debug report generating department firstly collects bug-related data and forwards them to the manager of a debug department (step S01). In this step, for example, bug-related data could come from the customer service department or the test department, and the bug-related data is then forwarded to the debug report generating department. The debug report generating department then generates a debug request form, and forwards this debug request form to the manager of the debug department along with the bug-related data.

Then, in step S02, the manager of the debug department decides whether to accept this debug request form depending on whether the bug-related data is sufficient. If the manager accepts the debug request form, then jump to step S04. If the manager does not accept the debug report, then jump to step S03.

In step S03, when the manager of the debug department does not accept the debug request form, a rejecting message is returned to the debug report generating department, so that the debug report generating departing can gather the bug-related data again, and forward more sufficient data to the manager of the debug department.

In step S04, when the manager of the debug department accepts the debug request form, the manager forwards the accepted debug request form and the bug-related data to a debug engineer. Then, in step S05, the debug engineer begins the debug operation according to the debug request form and the bug-related data. To this point, the workflow for the whole debug operation procedure is finished. It should be noted that the above-mentioned workflow can be realized by conventional paper documents, or be realized by electronic forms using computers and network systems.

The above-mentioned workflow, however, is not suitable for many reasons when being implemented practically. For example, the debug engineer cannot report to the manager when the debug request form is wrong or when the bug-related data is insufficient. This results in that the debug operation procedure could not be finished smoothly. In addition, when the debug engineer finishes the debug operation procedure, the correctness of the debug operation cannot be confirmed effectively.

Besides, since each step of the workflow shown in FIG. 1A is designed sequentially according to the original request form, one must design another workflow and flowchart all over again when the original workflow is not suitable for practical use. FIG. 1B is an example of the flowchart of a new workflow, which comprises some extra steps. As shown in FIG. 1B, after the manager of the debug department forwarded the debug request form and the bug-related data to the debug engineer (S04), step S06 is performed. In step S06, the debug engineer determines whether to accept the debug request form depending on whether the bug-related data is sufficient. When the debug engineer determines that the bug-related data is insufficient, the workflow jumps back to step S02 so that he/she can return the debug request form to the manager. The manager then can re-confirm whether the bug-related data is sufficient. In addition, when the debug engineer confirms that the bug-related data is sufficient, then the workflow jumps to step S05 to proceed with the debug operation procedure.

Finally, in step S07, the manager of the debug department confirms the completion of the debug operation procedure. The whole debug workflow ends when the manager made a confirmation for the completion of the debug operation procedure. If the manager of the debug department has doubts about the result of the debug operation procedure, the workflow jumps back to step SOI to re-confirm the contents of the bug-related data and to run the whole debug workflow all over again.

As mentioned above, conventional workflow managing method is constituted by a plurality of workflow paths 21 and work stages 22 as shown in FIG. 2. Therefore, when revising the workflow, one must both adjust (e.g. add or delete) the workflow paths 21 and adjust (e.g. add, delete, or modify) relevant work stages 22. For example, steps S05 to S07 are added or deleted step-by-step, and the step order of the workflow is rearrange between these steps. The actions required are difficult and complicated. Furthermore, after the workflow being revised, since the procedures are different, old data often becomes incompatible with new workflow, which results in the missing of the old data when one must start the new workflow and abandon the old one in the middle of the debug operation procedure.

Therefore, it is a subjective to provide a workflow defining and managing system that is capable of establishing flowcharts to control the progress of work or data more effectively and to revise the procedures and integrate all data more easily.

SUMMARY OF THE INVENTION

In view of the above, the invention directs to a workflow defining system and a workflow managing system that can establish and utilize a workflow to effectively control the progress of work and data.

To achieve this, the workflow defining system according to the invention comprises a state setting module, an instruction generating module and a path generating module. The state setting module sets at least one of a first terminal state, a second terminal state, and a third terminal state. The instruction generating module generates a first instruction, a second instruction, and a third instruction for the first terminal state, the second terminal state, and the third terminal state, respectively. The path generating module generates a first path, a second path, and a third path according to the first instruction, the second instruction, and the third instruction. The first path, the second path and the third path respectively point from the first instruction, the second instruction and the third instruction to one of the first terminal state, the second terminal state and the third terminal state.

The invention also discloses a workflow managing system, which comprises at least three terminal states, at least three instructions, and at least three paths. According to the invention, the workflow managing system at least comprises a first terminal state, a second terminal state, a third terminal state, a first instruction, a second instruction, a third instruction, a first path, a second path, and a third path. The first instruction, the second instruction and the third instruction are set according to the first terminal state, the second terminal state, and the third terminal state, respectively. The first path, the second path, and the third path are generated according to the first instruction, the second instruction, and the third instruction, respectively. The first path, the second path and the third path are pointed respectively from the first instruction, the second instruction, and the third instruction to at least one of the first terminal state, the second terminal state, and the third terminal state.

Since the workflow defining system and the workflow managing system according to the invention set different terminal states to control the workflow, and each terminal state is designed to have at least one instruction having a corresponding path, the progress of work or data can be controlled effectively. Furthermore, the workflow defining system and the workflow managing system according to the invention can revise the workflow easily by adding and deleting the instructions at the terminal states with the original terminal states remain unchanged. Therefore, the data can be integrated without any data loss.

BRIEF DESCRIPTION OF THE DRAWINGS

The invention will become more fully understood from the detailed description given hereinbelow illustration only, and thus is not limitative of the present invention, and wherein.

DETAILED DESCRIPTION OF THE INVENTION

The workflow defining system and the workflow managing system according to the embodiments of the invention will be described below with reference to relevant drawings, wherein the same elements are assigned with the same reference numbers.

Figure 3:
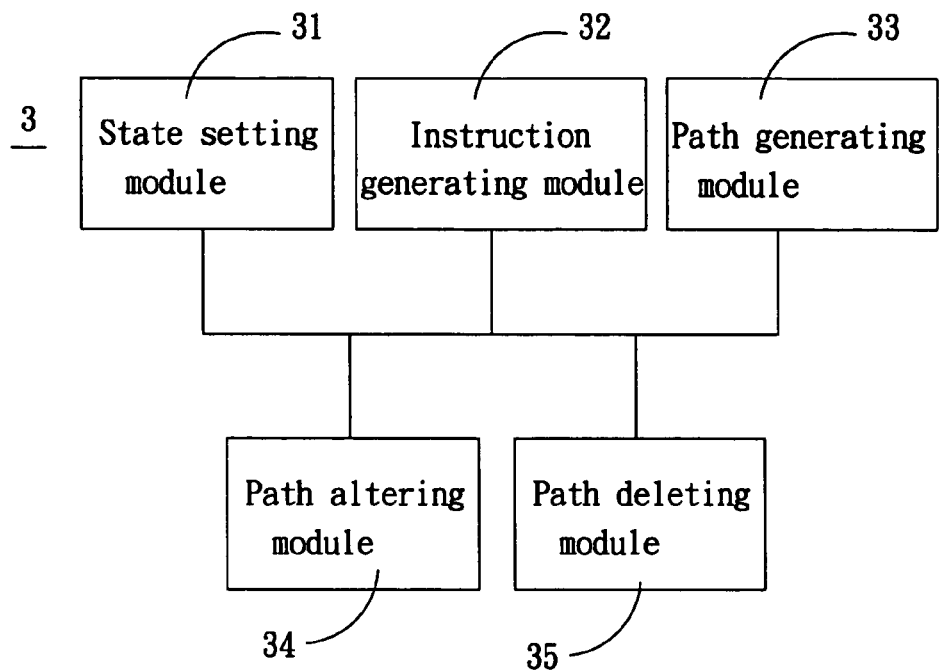
FIG. 3 is a schematic diagram showing the architecture of the workflow defining system according to an embodiment of the invention.

Please refer to FIG. 3, the workflow defining system 3 according to an embodiment of the invention comprises a state setting module 31, an instruction generating module 32, a path generating module 33, a path altering module 34, and a path deleting module 35. Herein, the state setting module 31, the instruction generating module 32, and the path generating module 33 are necessary, but the path altering module 34 and a path deleting module 35 are optional.

Figure 4A:
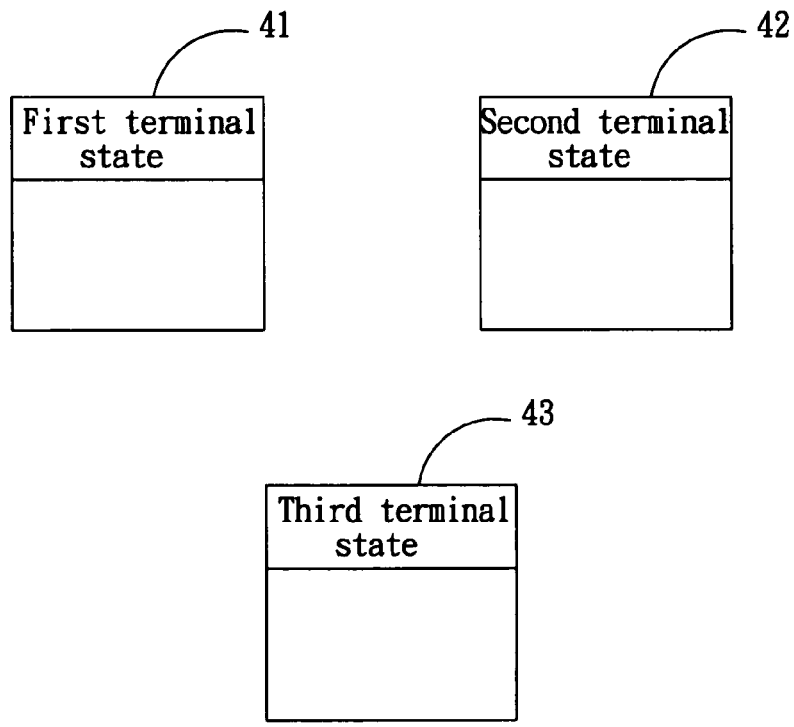
FIG. 4A to FIG. 4C are schematic diagrams showing a workflow generated by the workflow defining system according to an embodiment of the invention.

The state setting module 31 sets at least a first terminal state 41, a second terminal state 42, and a third terminal state 43 (as shown in FIG. 4A).

Figure 4B:
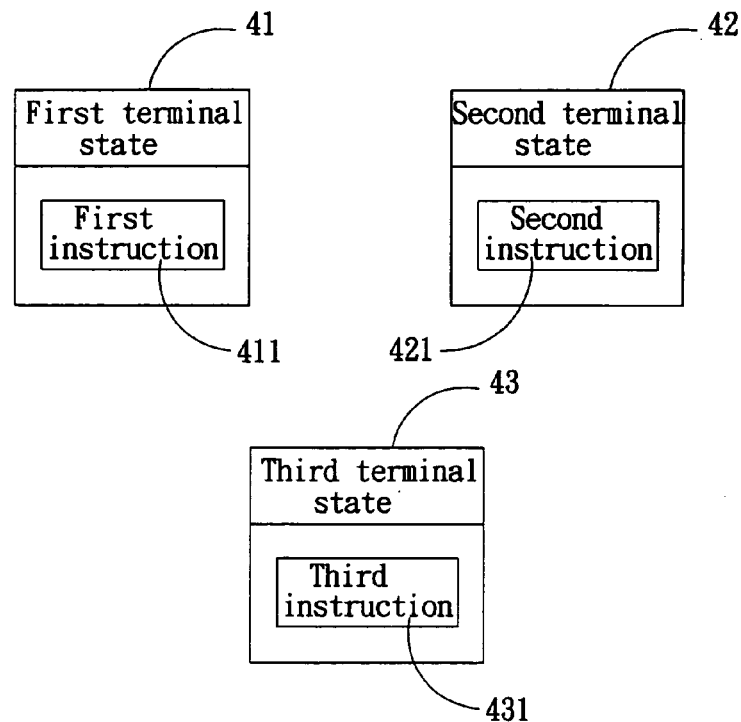
Figure 4C:
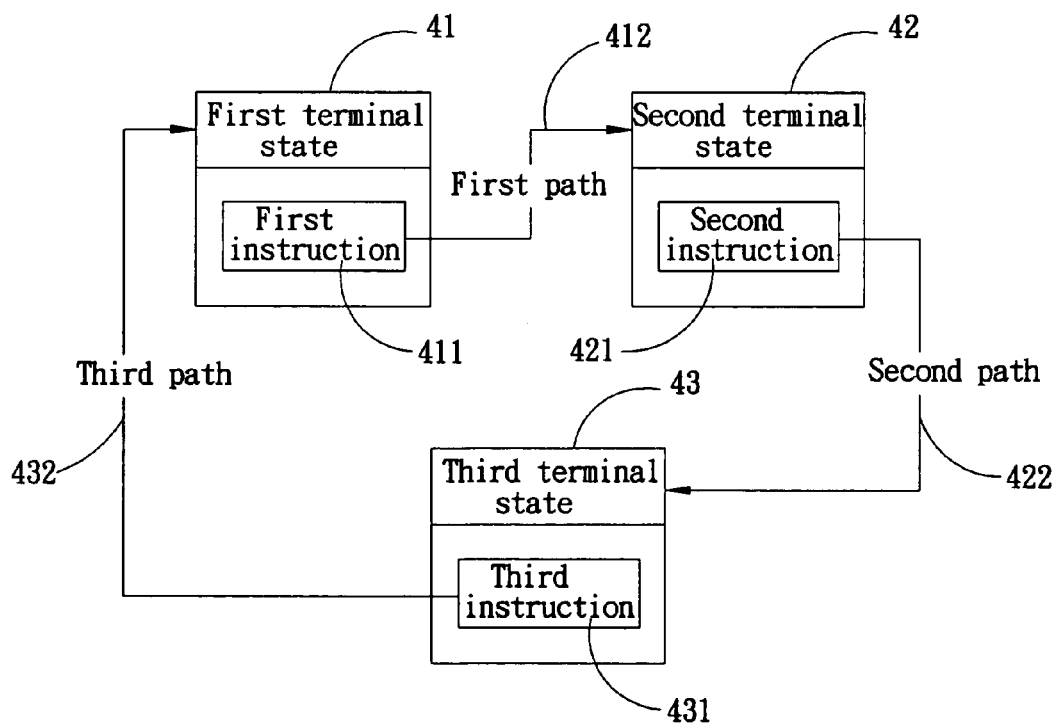

The instruction generating module 32 at least generates a first instruction 411, a second instruction 421, and a third instruction 431 for the first terminal state 41, the second terminal state 42, and the third terminal state 43, respectively (as shown in FIG. 4B).

The path generating module 43 generates a first path 412, a second path 422, and a third path 432 according to the first instruction 411, the second instruction 421, and the third instruction 431, respectively. Each of the first path 412, the second path 422 and the third path 432 points to one of the first terminal state 41, the second terminal state 42, and the third terminal state 43 from the first instruction 411, the second instruction 421, and the third instruction 431, respectively. In the present embodiment, the first path 412 is pointed from the first instruction 411 to the second terminal state 42, the second path 422 is pointed from the second instruction 412 to the third terminal state 43, and the third path 432 is pointed from the third instruction 431 to the first terminal state 41.

The path altering module 34 could alter at least one of the paths to point the path to another terminal state. For example, the path altering module 34 can alter the third path 432 to make it point to the second terminal state 42 (this alternation is not shown the drawings).

The path deleting module 35 could delete at least one of the paths. For example, the path deleting module can delete the third path 432 (this deleting action is not shown in the drawings).

The workflow defining system according to the embodiment of the invention cooperates with at least one terminal device, such as a first terminal device, a second terminal device and a third terminal device, which show the first terminal state 41, the second terminal state 42, and the third terminal state 43, respectively. When a user chooses to execute the first instruction 411 of the first terminal state 41 at the first terminal device, data at the first terminal state 41 can be output from the first terminal device to the second terminal device via the first path 412, and the data are thus input into the second terminal state 42. When the user chooses to execute the second instruction 421 of the second terminal state 42 at the second terminal device, data of the first terminal state 42 can be output from the second terminal device to the third terminal device via the second path 422, and the data are thus input into the third terminal state 43. When the user chooses to execute the third instruction 431 of the third terminal state 431 at the third terminal device, data of the third terminal state 43 can be output from the third terminal device to the first terminal device via the third path, and the data are thus input into the first terminal state 41. It should be noted that one terminal device may display multiple terminal states, and similarly, each terminal state may comprise multiple instructions. For instance, if the number of the terminal states is N and each terminal state may comprise one to N instructions, each terminal state can point to one to N terminal states. Of course, each instruction can point to the terminal state that it belongs or other terminal states, and different instructions in one terminal state can point to the same terminal state. Each instruction can also point to one particular terminal state or some terminal states in view of its contents.

Furthermore, except for obtaining from other terminal states via paths, the data of each terminal state can be obtained from the input of the user at the terminal device.

To make the content of the invention more comprehensive, a workflow of the debug operation procedure will be described herein below as an example.

Figure 5:
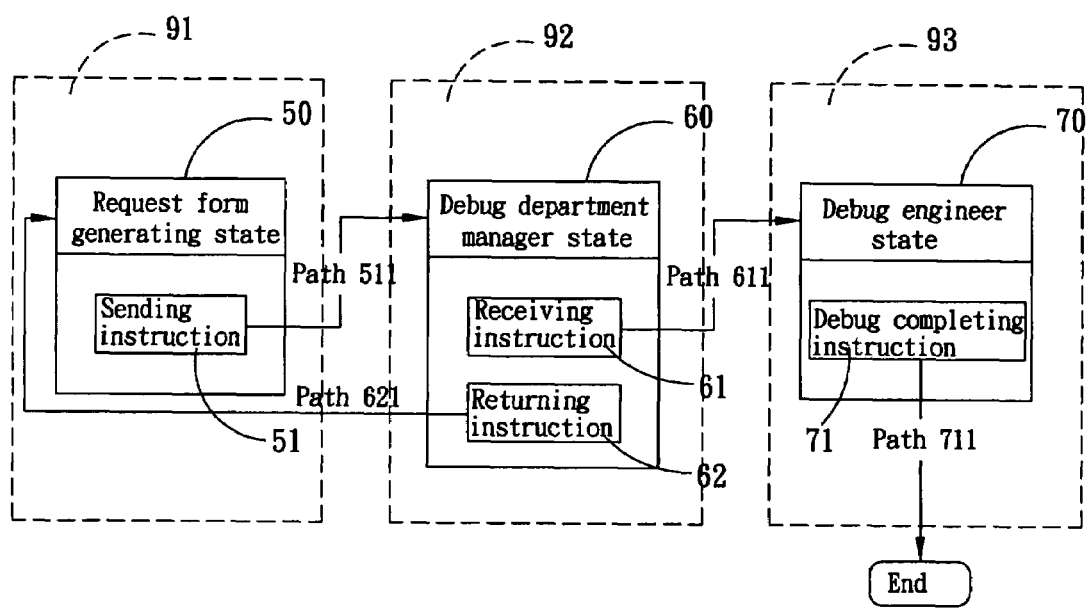
FIG. 5 is a schematic diagram showing a debug workflow generated by the workflow defining system according the embodiment of the invention.

Please refer to FIG. 5, a workflow defining system 3 according to another embodiment of the invention has three terminal states according to the departments comprised in the whole debug operation workflow, comprising a request form generating state 50, a debug department manager state 60, and a debug engineer state 70, which are shown on a first terminal device 91, a second terminal device 92, and a third terminal device 93, respectively. In the present embodiment, the request form generating state 50 comprises a sending instruction 51, the debug department manager state 60 comprises a receiving instruction 61 and a returning instruction 62, and the debug engineer state 70 comprises a debug completing instruction 71.

When the request form generating department chooses to execute the sending instruction 51 at the request form generating state 50 shown on the first terminal device 91, the bug-related data gathered by the debug report generating department are forwarded to the debug department manager state 60 of the second terminal device 92 via the path 511. As described previously, the bug-related data often comes from the customer service department or the test department, and the personnel of the debug request form generating department input these bug-related data into the request form generating state 50 using the first terminal device 91. After that, these bug-related data are forwarded to the debug department manager state 60.

Then, the manager of the debug department can choose to execute the receiving instruction 61 or the returning instruction 62 at the debug department manager state 60 shown on the second terminal device 92. In the present embodiment, when the manager of the debug department thinks that the data obtained are sufficient for debug operation, he/she can use the second terminal device 92 to choose to execute the receiving instruction 61. At this time, the bug-related data is forwarded from the debug department manager state 60 to the debug engineer state 70 shown on the third terminal device 93 via the path 611. If the manager of the debug department thinks that the data obtained are insufficient for debug operation, then he/she can choose to execute the returning instruction 62. At this time, the bug-related data and the debug request form are returned to the request form generating state 50 shown on the first terminal device 91 via the path 621. Then, the personnel of the debug report generating department may gather more useful bug-related data. When the personnel of the debug report generating department thinks that the bug-related data they gathered is sufficient enough, then they can execute the sending instruction 51 again to forward the more sufficient bug-related data to the debug department manager state 60.

Finally, when the debug engineer state 70 shown on the third terminal device 93 receives the bug-related data from the debug department manager state 60, the debug engineer can proceed with the operation according to this bug-related data. When the debug operation is finished, the debug engineer can use the third terminal device 93 to choose to execute the debug completing instruction 71 at the debug engineer state 70 to point to the work completion via the path 711.

It should be noted that according to the debug workflow of the present embodiment (as shown in FIG. 5), the actions of each department are the same as those of the conventional debug workflow (as shown in FIG. 1). Since the debug workflow established by the workflow defining system of the invention is basically constituted by the different states of each department, the progress of the work or data can be controlled effectively.

Figure 6:
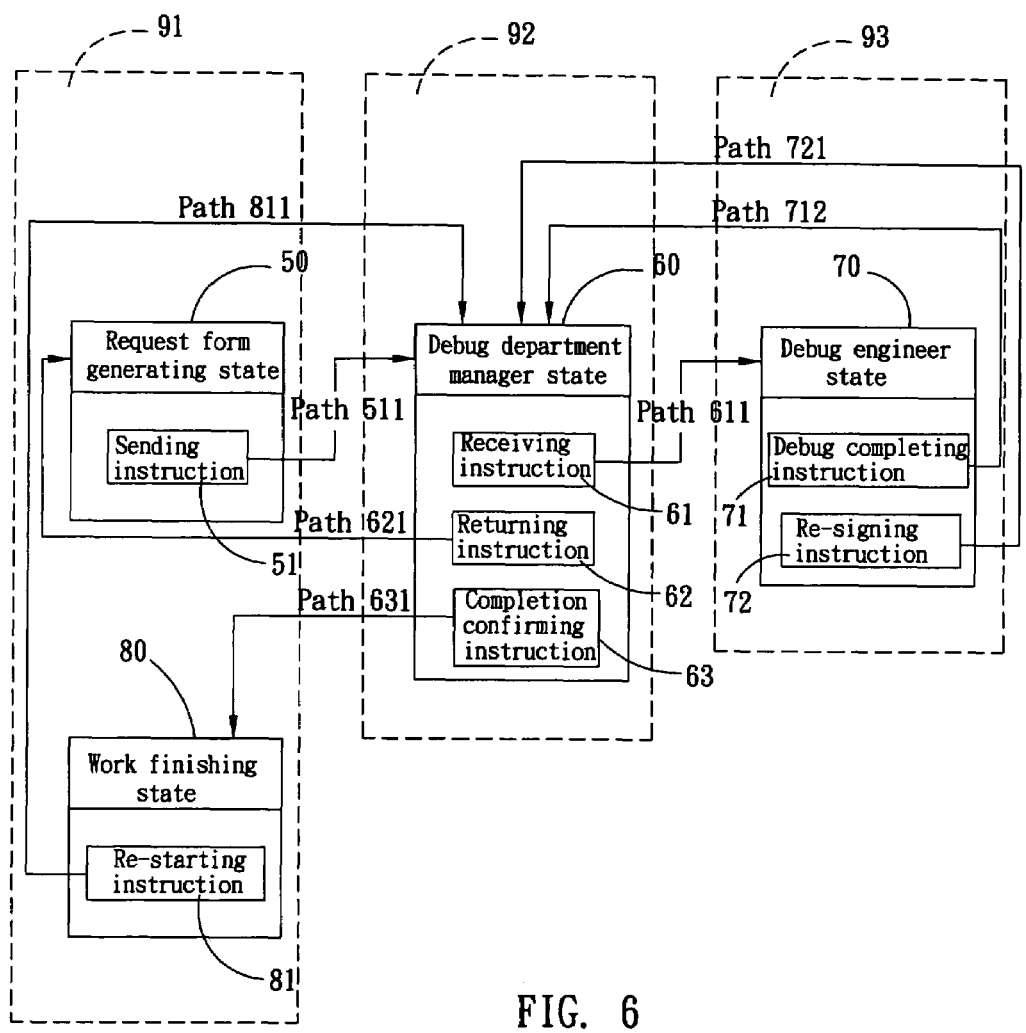
FIG. 6 is a schematic diagram showing another debug workflow generated by the workflow defining system according to the embodiment of the invention.

Please refer to FIG. 6, when it is necessary to revise the original workflow, the workflow defining system according to the present embodiment can further revise the debug workflow.

In the present embodiment, in order for the debug engineer to feedback to the manager when the debug request form is erroneous or when the bug-related data is insufficient, a re-signing instruction 72 can be added in the debug engineer state 70, and a path 721 from the re-signing instruction 72 to the debug department manager state 60 can be generated. When the debug engineer executes the re-signing instruction 72, a message or the debug request form is transmitted from the third terminal device 93 to the second terminal device 92 so as to forward the message or the debug request form from the debug engineer state 70 back to the debug department manager state 60. The manager of the debug department can examine the bug-related data again to confirm again whether to accept the bug-related data from the request form generating department, or to execute the returning instruction 62 to return the bug-related data and the debug request form to the request form generating state 50 via the path 621 for further bug-related data gathering.

Moreover, when the debug engineer finishes the debug operation, to confirm the correctness of the result of the debug operation, the result must be forwarded to the manager of the debug department so that the manager can confirm the result. As shown in FIG. 6, the path 711 corresponding to the debug completing instruction 71 is altered to be path 712, which points from the debug completing instruction 71 to the debug department manager state 60. This step may be divided further into two steps: the deletion of the path 711, and the addition of the path 712.

Then, a completion confirming instruction 63 is added in the debug department manager state 60, and a work finishing state 80 is generated. A path 631 is established, which points from the completion confirming instruction 63 to the work finishing state 80. In the present embodiment, when the manager of the debug department confirms the correctness of the debug result of the debug engineer, he/she can choose to execute the completion confirming instruction 63 to forward the message of the completion of the debug request form to the work finishing state 80.

In the present embodiment, the work finishing state 80 is shown on the first terminal device 91 for the personnel of the request form generating department to determine whether to conclude the debug request form according to the information of the work finishing state 80. The personnel of the request form generating department can also determine that the debug result in under expectation to start the debug workflow again. As shown in FIG. 6, the work finishing state 80 comprises a re-starting instruction 81, which points to the debug department manager state 60 via the path 811. Therefore, when the debug operation result does not meet the expectation of the request form generating department, the personnel of the request form generating department would choose to execute the re-starting instruction 81 to send this message to the debug department manager state 60 for the manager of the debug department to examine whether the bug-related data is sufficient or whether other problem exists. In the present embodiment, the personnel of the request form generating department may input new data into the requesting form generating state 50 or the work finishing state 80, the manager of the debug department may use the second terminal device 92 to input new data into the debug department manager state 60, and the debug engineer can use the third terminal device 93 to input new data into the debug engineer state 70.

As described above, after the workflow being revised, since the terminal states constituting the main architecture of the debug workflow remain the same, the problems of data loss and data compatibility before and after the workflow revision would not exist.

Figure 7:
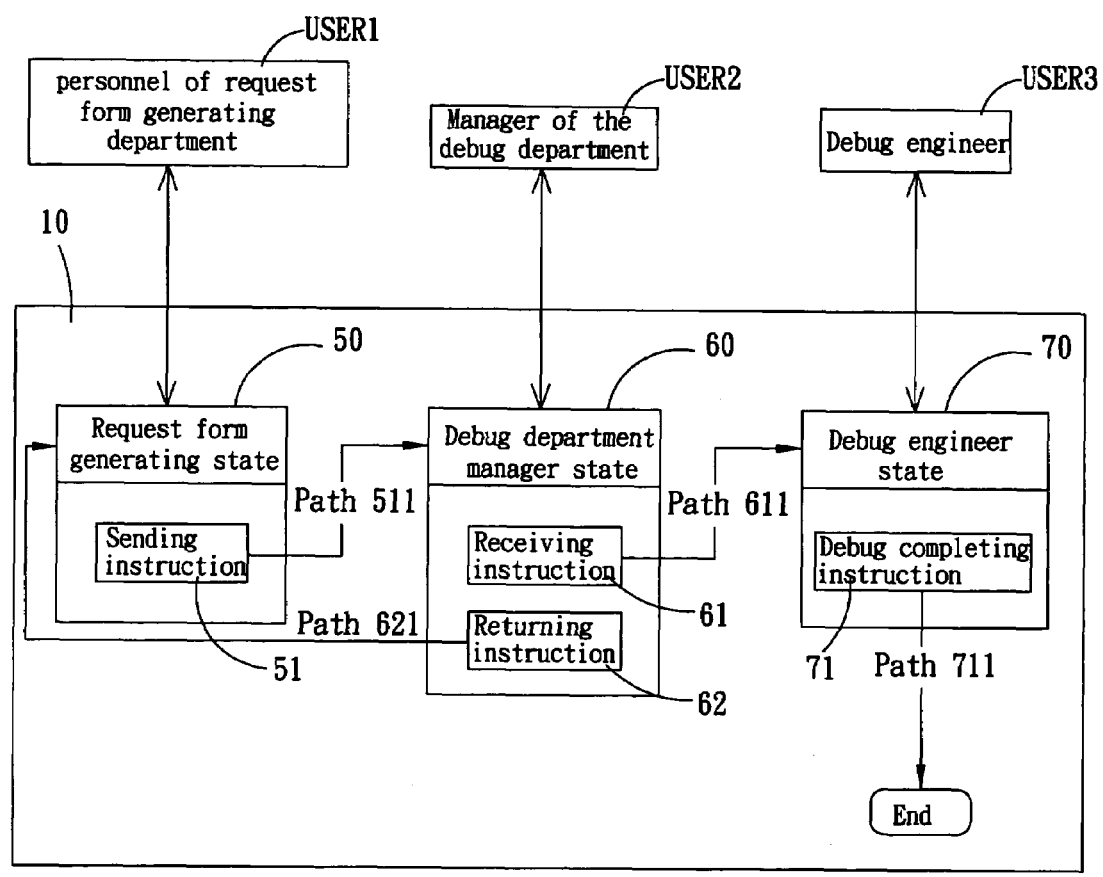
FIG. 7 is a schematic diagram showing the architecture of the workflow managing system according to another embodiment of the invention.

Furthermore, the workflow managing system according to the present embodiment comprises at least three terminal states, three instructions that are established according to the terminal states, and three paths that are generated according to those instructions. Please refer to FIG. 7, a workflow managing system 10 comprises a requesting form generating state 50, a debug department manager state 60, and a debug engineer state 70. Under the requesting form generating state 50 there exists a sending instruction 51. Under the debug department manager state 60 there exist a receiving instruction 61 and a returning instruction 62. Under the debug engineer state 70 there exists a debug completing instruction 71. Furthermore, a path 511 points from the sending instruction 51 to the debug department manager state 60, a path 611 points from the receiving instruction 61 to the debug engineer state 70, and a path 621 points from the returning instruction 62 to the requesting form generating state 50, and a path 711 points from the debug completing instruction 71 to work completion.

In the present embodiment, the workflow managing system 10 cooperates with a request form generating department person USER1, a manager of the debug department USER2, and a debug engineer USER3 to integrate the departments participating in the debug workflow and to achieve the objective of effective control of the progress of work and data.

Figure 8:
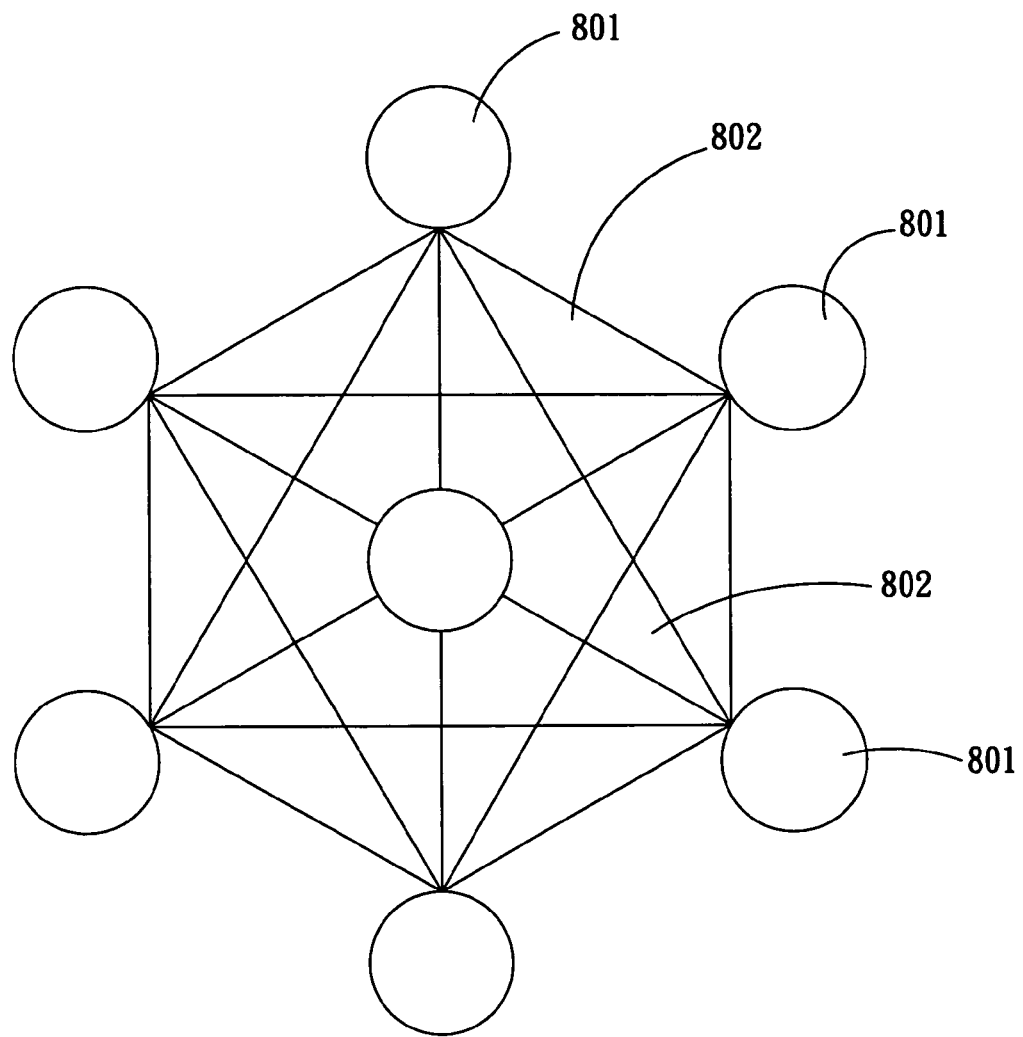
FIG. 8 is a schematic diagram showing the basic architecture of the workflow according to the embodiments of the invention.

Apparently, as shown in FIG. 8, the spirit of the invention can be extracted as to be the establishment of a plurality of paths 802 between the states 801. The key points are the relationship between the states 801 and the instructions, and how the states 801 are linked using the instructions and the paths 802.

Figure 1A:
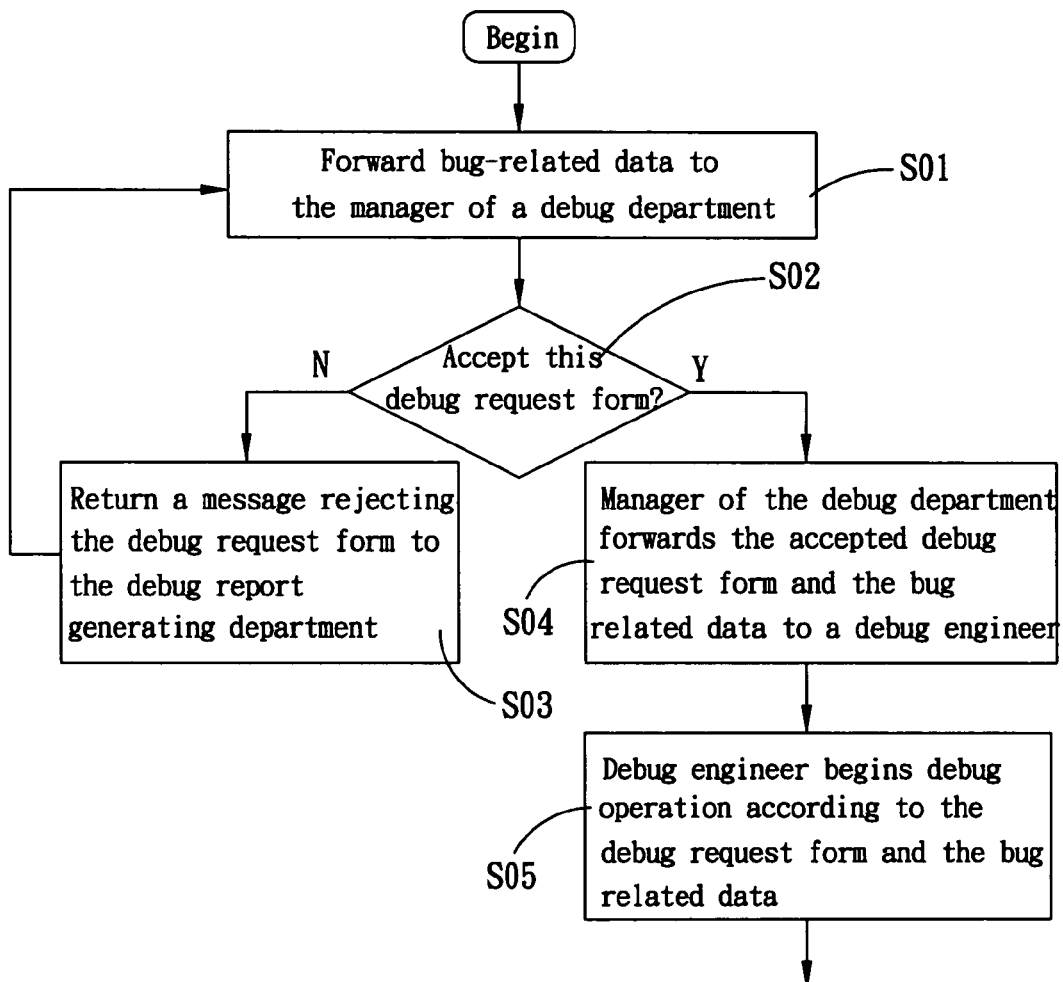
FIG. 1A and FIG. 1B are flowcharts showing two debug workflows in the prior art.
Figure 1B:
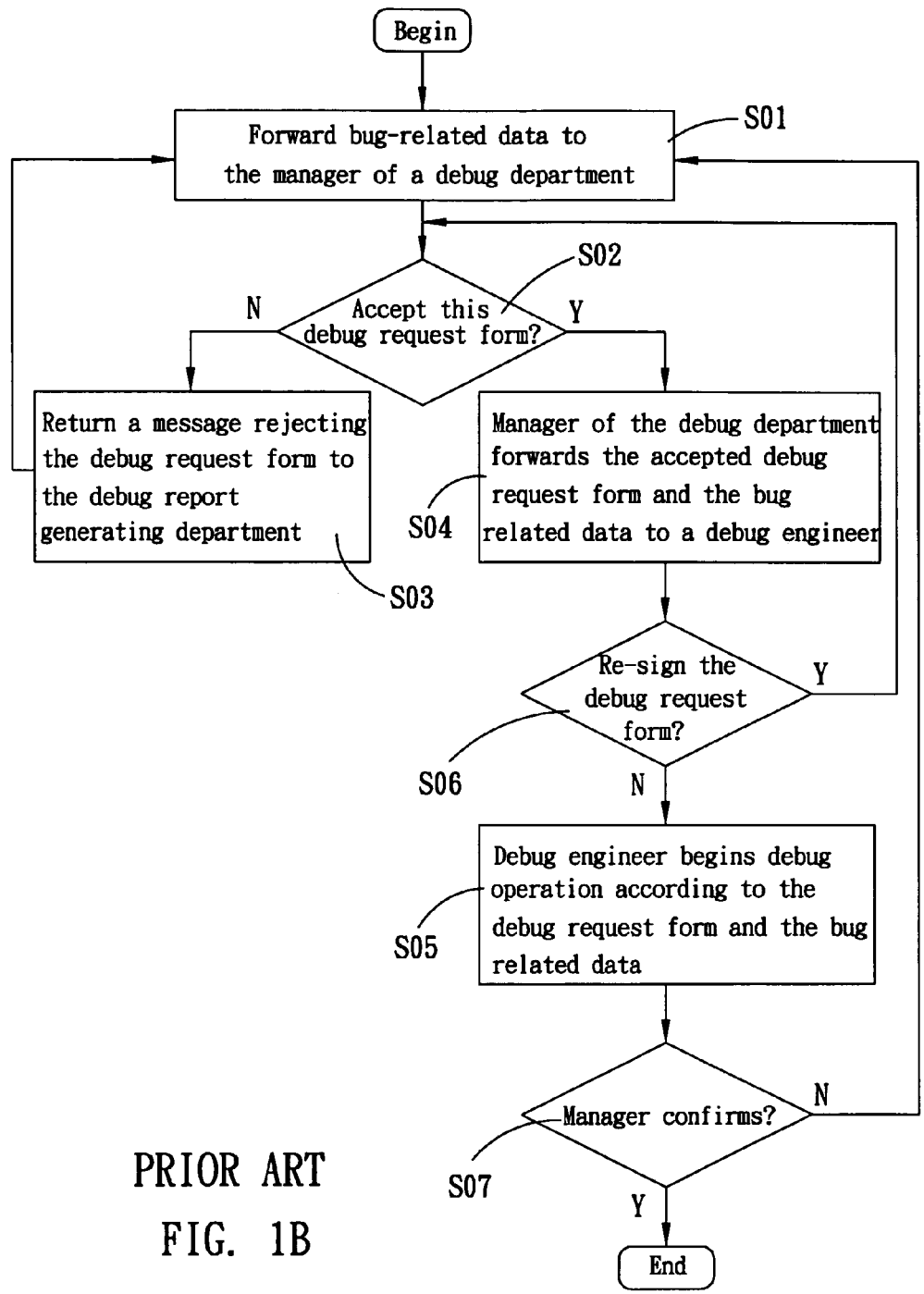
Figure 2:
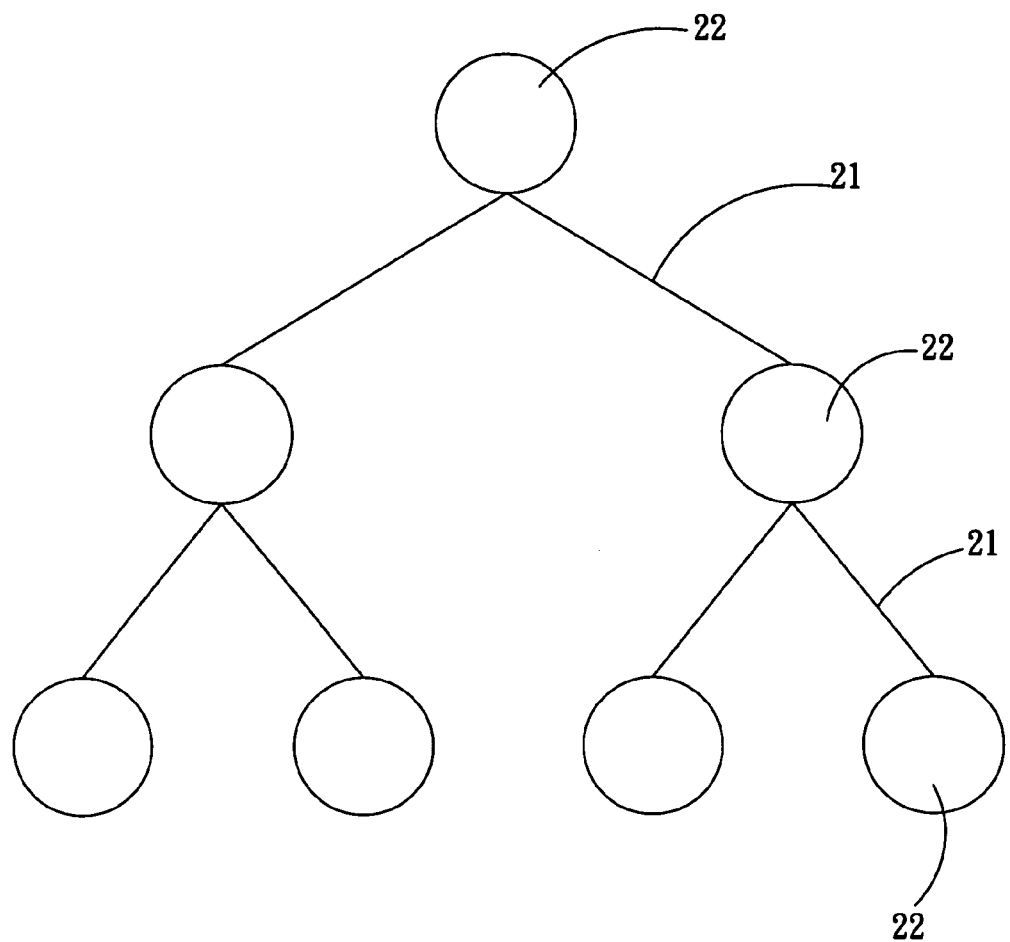
FIG. 2 is a schematic diagram showing the basic architecture of the workflow in the prior art.

Furthermore, the advantage of the invention can be realized by comparing the differences between FIG. 1A and FIG. 1B, the differences between FIG. 5 and FIG. 6, and the differences between FIG. 3 and FIG. 8. For example, except for the addition of the work finishing state 80 (at the first terminal device 91) in view of the new workflow, the basic architecture of the invention still comprises the requesting form generating state 50, the debug department manager state 60, and the debug engineer state 70. The workflow can be easily revised by simply change some instructions and some paths between the instructions and the paths. Comparatively, in the conventional technique, one must add some new steps and arrange the contents and paths of the each step, which makes the conventional technique more complicated and inefficient. For example, the invention can arrange the states to make it correspond to the structure of the company, so that each department can control its job more easily. Comparatively, when revising the workflow, according to the conventional technique, one always has to change the job of each department accordingly. This makes the workflow revision process more fragmentary, and data tend to be lost during the workflow revision process.

In addition, the workflow managing system 10 may further comprise at lease one added terminal state, at least one added instruction, and at least one added path to revise the whole workflow in view of actual needs. The process of revising the workflow is similar to those described previously, thus the description is omitted for concise purpose.

To sum up, the workflow defining system according to the invention comprises different terminal states as its basic architecture. Each terminal state comprises at least one instruction, and each instruction has a corresponding path. Thus it is easier to control the workflow and the progress of the work or data. Moreover, the workflow defining system according to the invention can revise the workflow easily with the original basic system architecture remain unchanged by adding and deleting terminal states, adding and deleting instructions at each terminal state and/or altering paths corresponding to each instruction. Therefore, all data can be integrated without data loss. Furthermore, the workflow managing system according to the invention utilizes the flowchart established by the workflow defining system previously mentioned to control the workflow, therefore the progress of the work and data can be controlled effectively, and all data can be integrated without data loss.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A workflow defining system, comprising:
    a state setting module, which at least sets a request form generating state, a debug department manager state, and a debug engineer state;
    an instruction generating module, which generates a sending instruction, a receiving instruction and a returning instruction, and a debug completing instruction for the request form generating state, the debug department manager state, and the debug engineer state, respectively; and
    a path generating module, which generates a first path, a second path, a third path, and a fourth path according to the sending instruction, the receiving instruction, the returning instruction, and the debug completing instruction, wherein the first path points from the sending instruction to the debug department manager state, the second path points from the receiving instruction to the debug engineer state, the third path points from the returning instruction to the request form generating state and the fourth path points from the debug completing instruction to a generated fourth state or a work finishing state,
    wherein personnel of the debug request form generating department select instructions generated for the request form generating state, for execution, only on a first terminal device, a manager of a debug department selects instructions generated for the debug department manager state, for execution, only on a second terminal device, and a debug engineer selects instructions generated for the debug engineer state, for execution, only on a third terminal device.

2. The workflow defining system according to claim 1, wherein:
    data of the request form generating state are output from the request form generating state via the first path when the sending instruction is executed;
    data of the debug department manager state are output from the debug department manager state via the second path when the receiving is executed;
    data of the debug department manager state are output from the debug department manager state via the third path when the returning instruction is executed; and
    data of the debug engineer state are output from the debug engineer state via the third path when the debug completing instruction is executed.

3. The workflow defining system according to claim 1, wherein:
the instruction generating module generates a re-starting instruction for the work finishing state; and
the path generating module generates a fifth path according to the re-starting instruction, the fifth path pointing from the re-starting instruction to the debug department manager state.

4. The workflow defining system according to claim 3, wherein:
the instruction generating module generates a completion confirming instruction for the debug department manager state, the path generating module generates a sixth path according to the completion confirming instruction, and the sixth path points from the completion confirming instruction to the work finishing state, wherein the instruction generating module generates a re-signing instruction for the debug engineer state, the path generating module generates a seventh path according to the re-signing instruction, and the seventh path points from the debug engineer state to the debug department manager state.

5. The workflow defining system according to claim 1, further comprising:
a path altering module, which alters the fourth path to point to the debug department manager state.

6. The workflow defining system according to claim 1, wherein:
added data are input from the terminal device to the request form generating state, the debug department manager state, or the debug engineer state.

7. A workflow managing system, comprising:
at least three terminal states, which at least comprise a request form generating state, a debug department manager state, and a debug engineer state;
at least four instructions, which at least comprise a sending instruction, a receiving instruction and a returning instruction, and a debug completing instruction, wherein the sending instruction, the receiving instruction and the returning instruction, and the debug completing instruction are set according to the request form generating state, the debug department manager state, and the debug engineer state, respectively; and
at least four path, which at least comprise a first path, a second path, a third path, and a fourth path, wherein the first path, the second path, the third path and the fourth path are generated according to the sending instruction, the receiving instruction, the returning instruction, and the debug completing instruction, respectively, and the first path points from the sending instruction to the debug department manager state, the second path points from the receiving instruction to the debug engineer state, the third path points from the returning instruction to the request form generating state and the forth path point from debug completing instruction to a generated fourth state or a work finishing state,
wherein personnel of the debug request form generating department select instructions generated for the request form generating state, for execution, only on a first terminal device, a manager of a debug department selects instructions generated for the debug department manager state, for execution, only on a second terminal device, and a debug engineer selects instructions generated for the debug engineer state, for execution, only on a third terminal device.

8. The workflow managing system according to claim 7, wherein:
data of the request form generating state are output from the request form generating state via the first path when the sending instruction is executed;
data of the debug department manager state are output from the debug department manager state via the second path when the receiving instruction is executed;
data of the debug department manager state are output from the debug department manager state via the third path when the returning instruction is executed; and
data of the debug engineer state are output from the debug engineer state via the fourth path when the debug completing instruction is executed.

9. The workflow managing system according to claim 7, further comprising:
a work finishing state;
a re-starting instruction, which is generated according to the work finishing state; and
a fifth path, which is generated according to the re-starting instruction, wherein the fifth path points from the re-starting instruction to the debug department manager state.

10. The workflow managing system according to claim 9, further comprising:
a completion confirming instruction, which is generated according to the debug department manager state; and
a sixth path, which is generated according to the completion confirming instruction, wherein the sixth path points from the completion confirming instruction to the work finishing state.

11. The workflow managing system according to claim 7, further comprising:
a re-signing instruction, which is set according to the debug engineer state; and
a seventh path, which is generated according to the re-signing instruction, wherein the seventh path points from the re-signing instruction to the debug department manager state.

12. The workflow managing system according to claim 7, wherein:
the fourth path could be altered to point to the debug department manager state.

13. The workflow managing system according to claim 7, which cooperates with a user, wherein:
receives a selection of the user, which selects the sending instruction, the receiving instruction, the returning instruction or the debug completing instruction from the request form generating state, the debug department manager state or the debug engineer state, so as to execute the sending instruction, the receiving instruction, the returning instruction, or the debug completing instruction.

14. The workflow managing system according to claim 13, wherein:
the request form generating state, the debug department manager state or the debug engineer state could receive an added data input by the user.

* * * * *